(12) United States Patent
Wang et al.

(10) Patent No.: US 12,512,155 B2
(45) Date of Patent: Dec. 30, 2025

(54) TECHNOLOGIES FOR CURRENT BIASING FOR THREE-DIMENSIONAL CROSSPOINT MEMORY CELLS

(71) Applicant: Intel Corporation, Santa Clara, CA (US)

(72) Inventors: Jonathan Y. Wang, Folsom, CA (US); Yasir Mohsin Husain, Folsom, CA (US); Ashraf B. Islam, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 17/703,921

(22) Filed: Mar. 24, 2022

(65) Prior Publication Data

US 2023/0307043 A1   Sep. 28, 2023

(51) Int. Cl.
*G11C 13/00* (2006.01)
*H10B 63/00* (2023.01)
*H10N 70/00* (2023.01)

(52) U.S. Cl.
CPC ...... *G11C 13/0038* (2013.01); *G11C 13/0004* (2013.01); *G11C 13/0026* (2013.01); *G11C 13/0028* (2013.01); *H10B 63/84* (2023.02); *G11C 2213/71* (2013.01); *H10N 70/826* (2023.02); *H10N 70/882* (2023.02)

(58) Field of Classification Search
CPC ............ G11C 13/0038; G11C 13/0004; G11C 13/0026; G11C 13/0028; G11C 2213/71; G11C 7/062; G11C 2013/005; G11C 2213/77; G11C 13/003; H10N 70/826; H10N 70/882; H10B 63/24; H10B 63/10; H10B 63/84
See application file for complete search history.

(56) References Cited

U.S. PATENT DOCUMENTS

| | | | |
|---|---|---|---|
| 9,202,543 B2* | 12/2015 | Boujamaa | G11C 13/004 |
| 10,528,643 B1 | 1/2020 | Choi et al. | |
| 2005/0111261 A1* | 5/2005 | Lee | G11C 16/28 365/185.21 |
| 2007/0133293 A1* | 6/2007 | Chih | G11C 16/3418 365/185.18 |
| 2013/0021838 A1* | 1/2013 | Tomotani | G11C 29/50008 365/148 |
| 2013/0070516 A1* | 3/2013 | Tomotani | G11C 13/0007 365/148 |
| 2014/0153313 A1* | 6/2014 | Boujamaa | G11C 7/14 365/207 |
| 2014/0268975 A1* | 9/2014 | Kitagawa | G11C 7/18 365/63 |
| 2019/0013071 A1 | 1/2019 | Srinivasan et al. | |

(Continued)

*Primary Examiner* — Khamdan N. Alrobaie
(74) *Attorney, Agent, or Firm* — Alliance IP, LLC

(57) ABSTRACT

Techniques for current biasing for memory cells are disclosed. In the illustrative embodiment, a source follower sets a voltage on a bitline of a memory cell. The current through the source follower is limited by a current mirror in series with the source follower. When additional current is required that the source follower cannot supply, a feedback transistor is activated to provide additional current. Additionally, in some embodiments, the current through the feedback transistor is copied to a current mirror, and the copied current is used to sense the state of the memory cell.

21 Claims, 7 Drawing Sheets

(56) References Cited

U.S. PATENT DOCUMENTS

| | | | |
|---|---|---|---|
| 2019/0096482 A1 | 3/2019 | Zeng et al. | |
| 2021/0035637 A1* | 2/2021 | Capecchi | G11C 13/003 |
| 2021/0390996 A1* | 12/2021 | Chang | G11C 13/0038 |
| 2023/0207005 A1* | 6/2023 | Lin | G11C 13/0026 |
| | | | 365/148 |
| 2023/0410878 A1* | 12/2023 | Lin | G11C 29/028 |
| 2024/0006000 A1* | 1/2024 | Qiu | H10B 41/00 |

* cited by examiner

TECHNOLOGIES FOR CURRENT BIASING FOR THREE-DIMENSIONAL CROSSPOINT MEMORY CELLS

BACKGROUND

In certain circuits such as phase-change memory cells, precise application of current can increase the operation of certain functions, such as reading the state of the memory cell. However, a circuit that requires a small amount of area and can quickly and precisely provide a desired amount of current can be challenging.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
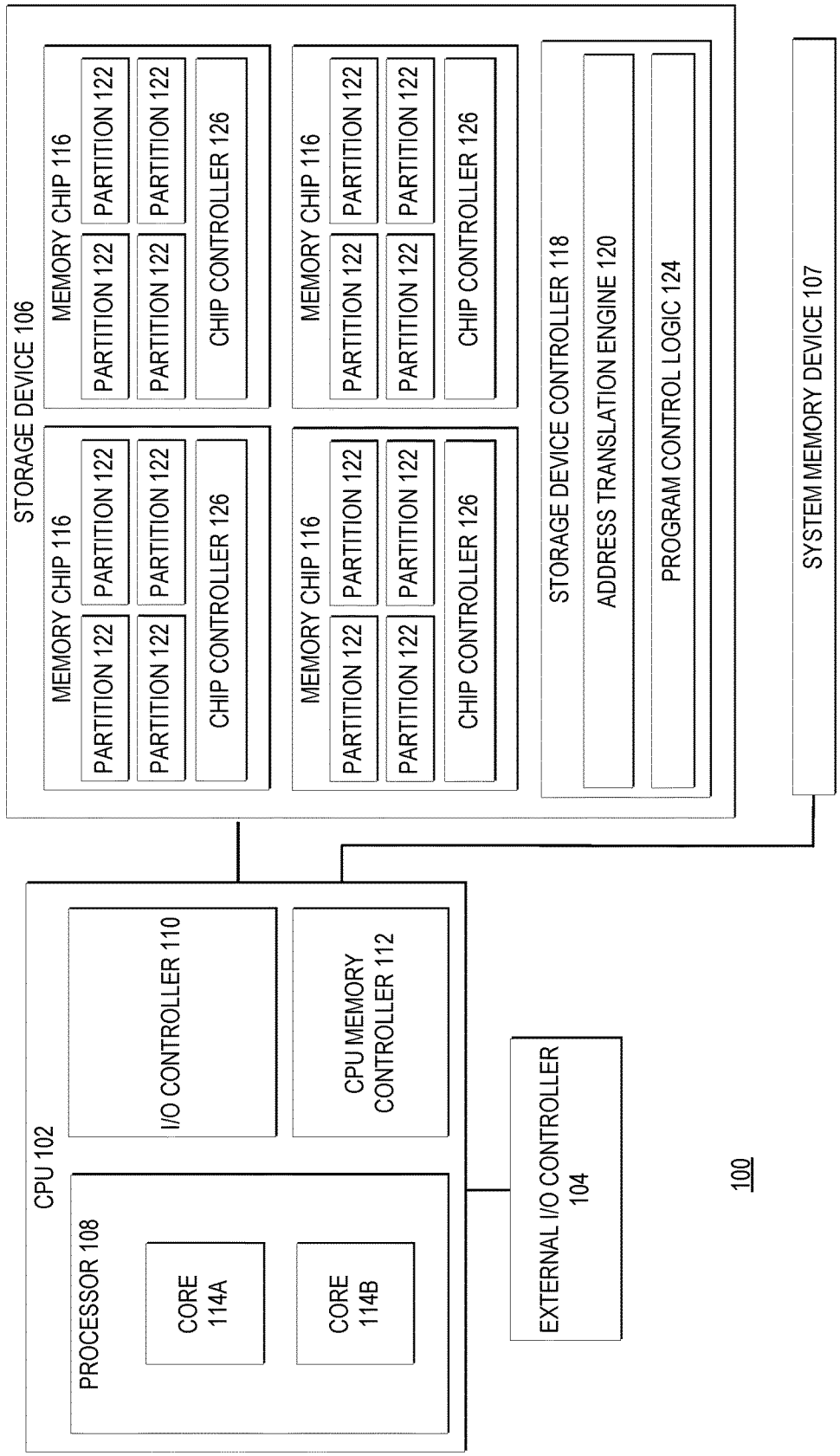
FIG. 1 illustrates components of a computer system in accordance with certain embodiments.

In the illustrative embodiment, a memory cell of a 3D crosspoint memory array can be read by applying a demarcation voltage across it and monitoring a current that passes through the memory cell. A voltage regulator such as a source follower may be used to provide the desired voltage. However, the source follower must pass enough current to charge up the bitline and/or wordline, and, as the source follower output voltage approaches the gate bias voltage, the current output reduces as well, leading to a relatively slow charging time that is susceptible to process variations. Additionally, the initial inrush current when the source follower is first turned on as well as additional current draw when the memory cell snaps to a low-resistance state reduce the output voltage of the source follower.

To address the limitations of a single source follower, in the illustrative embodiment, a current mirror is added in series with the source follower to limit the current through the source follower, and a feedback current source is added to boost current when the source follower is current saturated. Additionally, in the illustrative embodiment, a sensing circuit operates by copying and sensing the current through the feedback current source.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

FIG. 1 illustrates components of a computer system 100 in accordance with certain embodiments. System 100 includes a central processing unit (CPU) 102 coupled to an external input/output (I/O) controller 104, a storage device 106 such as a solid state drive (SSD), and system memory device 107. During operation, data may be transferred between a storage device 106 and/or system memory device 107 and the CPU 102. In various embodiments, particular memory access operations (e.g., read and write operations) involving a storage device 106 or system memory device 107 may be issued by an operating system and/or other software applications executed by processor 108. In various embodiments, a storage device 106 may include a storage device controller 118 and one or more memory chips 116 that each comprise any suitable number of memory partitions 122.

In various embodiments, a memory partition 122 may include a 3D crosspoint memory array. In some embodiments, a 3D crosspoint memory array may comprise a transistor-less (e.g., at least with respect to the data storage elements of the memory) stackable crosspoint architecture in which memory cells sit at the intersection of row address lines and column address lines arranged in a grid.

CPU 102 comprises a processor 108, such as a microprocessor, an embedded processor, a digital signal processor (DSP), a network processor, a handheld processor, an application processor, a co-processor, an SOC, or other device to execute code (e.g., software instructions). Processor 108, in the depicted embodiment, includes two processing elements (cores 114A and 114B in the depicted embodiment), which may include asymmetric processing elements or symmetric processing elements. However, a processor may include any number of processing elements that may be symmetric or asymmetric. CPU 102 may be referred to herein as a host computing device (though a host computing device may be any suitable computing device operable to issue memory access commands to a storage device 106).

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 114 (e.g., 114A or 114B) may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 110 is an integrated I/O controller that includes logic for communicating data between CPU 102 and I/O devices. In other embodiments, the I/O controller 110 may be on a different chip from the CPU 102. I/O devices may refer to any suitable devices capable of transferring data to and/or receiving data from an electronic system, such as CPU 102. For example, an I/O device may comprise an audio/video (A/V) device controller such as a graphics accelerator or audio controller; a data storage device controller, such as a magnetic storage disk or optical storage disk controller; a wireless transceiver; a network processor; a network interface controller; or a controller for another input device such as a monitor, printer, mouse, keyboard, or scanner; or other suitable device. In a particular embodiment, an I/O device may comprise a storage device 106 coupled to the CPU 102 through I/O controller 110.

An I/O device may communicate with the I/O controller 110 of the CPU 102 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 110 and an associated I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller 110 may be located off-chip (e.g., not on the same chip as CPU 102) or may be integrated on the same chip as the CPU 102.

CPU memory controller 112 is an integrated memory controller that controls the flow of data going to and from one or more system memory devices 107. CPU memory controller 112 may include logic operable to read from a system memory device 107, write to a system memory device 107, or to request other operations from a system memory device 107. In various embodiments, CPU memory controller 112 may receive write requests from cores 114 and/or I/O controller 110 and may provide data specified in these requests to a system memory device 107 for storage therein. CPU memory controller 112 may also read data from a system memory device 107 and provide the read data to I/O controller 110 or a core 114. During operation, CPU memory controller 112 may issue commands including one or more addresses of the system memory device 107 in order to read data from or write data to memory (or to perform other operations). In some embodiments, CPU memory controller 112 may be implemented on the same chip as CPU 102, whereas in other embodiments, CPU memory controller 112 may be implemented on a different chip than that of CPU 102. I/O controller 110 may perform similar operations with respect to one or more storage devices 106.

The CPU 102 may also be coupled to one or more other I/O devices through external I/O controller 104. In a particular embodiment, external I/O controller 104 may couple a storage device 106 to the CPU 102. External I/O controller 104 may include logic to manage the flow of data between one or more CPUs 102 and I/O devices. In particular embodiments, external I/O controller 104 is located on a motherboard along with the CPU 102. The external I/O controller 104 may exchange information with components of CPU 102 using point-to-point or other interfaces.

A system memory device 107 may store any suitable data, such as data used by processor 108 to provide the functionality of computer system 100. For example, data associated with programs that are executed or files accessed by cores 114 may be stored in system memory device 107. Thus, a system memory device 107 may include a system memory that stores data and/or sequences of instructions that are executed or otherwise used by the cores 114. In various embodiments, a system memory device 107 may store temporary data, persistent data (e.g., a user's files or instruction sequences) that maintains its state even after power to the system memory device 107 is removed, or a combination thereof. A system memory device 107 may be dedicated to a particular CPU 102 or shared with other devices (e.g., one or more other processors or other devices) of computer system 100.

In various embodiments, a system memory device 107 may include a memory comprising any number of memory partitions, a memory device controller, and other supporting logic (not shown). A memory partition may include non-volatile memory and/or volatile memory.

Non-volatile memory is a storage medium that does not require power to maintain the state of data stored by the medium, thus non-volatile memory may have a determinate state even if power is interrupted to the device housing the memory. Nonlimiting examples of nonvolatile memory may include any or a combination of: 3D crosspoint memory, phase change memory (e.g., memory that uses a chalcogenide glass phase change material in the memory cells), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, anti-ferroelectric memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM), a resistive memory, magnetoresistive random access memory (MRAM) memory that incorporates memristor technology, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory.

Volatile memory is a storage medium that requires power to maintain the state of data stored by the medium (thus volatile memory is memory whose state (and therefore the data stored on it) is indeterminate if power is interrupted to the device housing the memory). Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications.

A storage device 106 may store any suitable data, such as data used by processor 108 to provide functionality of computer system 100. For example, data associated with programs that are executed or files accessed by cores 114A and 114B may be stored in storage device 106. Thus, in some embodiments, a storage device 106 may store data and/or sequences of instructions that are executed or otherwise used by the cores 114A and 114B. In various embodiments, a storage device 106 may store persistent data (e.g., a user's files or software application code) that maintains its state even after power to the storage device 106 is removed. A storage device 106 may be dedicated to CPU 102 or shared with other devices (e.g., another CPU or other device) of computer system 100.

In the embodiment depicted, storage device 106 includes a storage device controller 118 and four memory chips 116 each comprising four memory partitions 122 operable to store data, however, a storage device may include any suitable number of memory chips each having any suitable number of memory partitions. A memory partition 122 includes a plurality of memory cells operable to store data. The cells of a memory partition 122 may be arranged in any suitable fashion, such as in rows (e.g., bitlines) and columns (e.g., wordlines), three dimensional structures, sectors, or in other ways. In various embodiments, the cells may be logically grouped into banks, blocks, subblocks, bitlines, pages, frames, bytes, slices, or other suitable groups. In various embodiments, a memory partition 122 may include any of the volatile or non-volatile memories listed above or other suitable memory. In a particular embodiment, each memory partition 122 comprises one or more 3D crosspoint memory arrays. 3D crosspoint arrays are described in more detail in connection with the following figures.

In various embodiments, storage device 106 may comprise a disk drive (e.g., a solid state drive); a memory card; a Universal Serial Bus (USB) drive; a Dual In-line Memory Module (DIMM), such as a Non-Volatile DIMM (NVDIMM); storage integrated within a device such as a smartphone, camera, or media player; or other suitable mass storage device.

In a particular embodiment, one or more memory chips 116 are embodied in a semiconductor package. In various embodiments, a semiconductor package may comprise a casing comprising one or more semiconductor chips (also referred to as dies). A package may also comprise contact pins or leads used to connect to external circuits. In various embodiments, a memory chip may include one or more memory partitions 122.

Accordingly, in some embodiments, storage device 106 may comprise a package that includes a plurality of chips that each include one or more memory partitions 122. However, a storage device 106 may include any suitable arrangement of one or more memory partitions and associated logic in any suitable physical arrangement. For example, memory partitions 122 may be embodied in one or more different physical mediums, such as a circuit board, semiconductor package, semiconductor chip, disk drive, other medium, or any combination thereof.

System memory device 107 and storage device 106 may comprise any suitable types of memory and are not limited to a particular speed, technology, or form factor of memory in various embodiments. For example, a storage device 106 may be a disk drive (such as a solid-state drive), memory integrated with a computing device (e.g., memory integrated on a circuit board of the computing device), a memory module (e.g., a dual in-line memory module) that may be inserted in a memory socket, or other type of storage device. Similarly, system memory 107 may have any suitable form factor. Moreover, computer system 100 may include multiple different types of storage devices.

System memory device 107 or storage device 106 may include any suitable interface to communicate with CPU memory controller 112 or I/O controller 110 using any suitable communication protocol such as a DDR-based protocol, PCI, PCIe, USB, SAS, SATA, FC, System Management Bus (SMBus), or other suitable protocol. In some embodiments, a system memory device 107 or storage device 106 may also include a communication interface to communicate with CPU memory controller 112 or I/O controller 110 in accordance with any suitable logical device interface specification such as NVMe, AHCI, or other suitable specification. In particular embodiments, system memory device 107 or storage device 106 may comprise multiple communication interfaces that each communicate using a separate protocol with CPU memory controller 112 and/or I/O controller 110.

Storage device controller 118 may include logic to receive requests from CPU 102 (e.g., via an interface that communicates with CPU memory controller 112 or I/O controller 110), cause the requests to be carried out with respect to the memory chips 116, and provide data associated with the requests to CPU 102 (e.g., via CPU memory controller 112 or I/O controller 110). Storage device controller 118 may also be operable to detect and/or correct errors encountered during memory operations via an error correction code (ECC engine). In various embodiments, controller 118 may also monitor various characteristics of the storage device 106 such as the temperature or voltage and report associated statistics to the CPU 102. Storage device controller 118 can be implemented on the same circuit board or device as the memory chips 116 or on a different circuit board or device. For example, in some environments, storage device controller 118 may be a centralized storage controller that manages memory operations for multiple different storage devices 106 of computer system 100.

In various embodiments, the storage device 106 also includes program control logic 124 which is operable to control the programming sequence performed when data is written to or read from a memory chip 116. In various embodiments, program control logic 124 may provide the various voltages (or information indicating which voltages should be provided) that are applied to memory cells during the programming and/or reading of data (or perform other operations associated with read or program operations), perform error correction, and perform other suitable functions.

In various embodiments, the program control logic 124 may be integrated on the same chip as the storage device controller 118 or on a different chip. In the depicted embodiment, the program control logic 124 is shown as part of the storage device controller 118, although in various embodiments, all or a portion of the program control logic 124 may be separate from the storage device controller 118 and communicably coupled to the storage device controller 118. For example, all or a portion of the program control logic 124 described herein may be located on a memory chip 116. In various embodiments, reference herein to a "controller" may refer to any suitable control logic, such as storage device controller 118, chip controller 126, or a partition controller. In some embodiments, reference to a controller may contemplate logic distributed on multiple components, such as logic of a storage device controller 118, chip controller 126, and/or a partition controller.

In various embodiments, storage device controller 118 may receive a command from a host device (e.g., CPU 102), determine a target memory chip for the command, and communicate the command to a chip controller 126 of the target memory chip. In some embodiments, the storage device controller 118 may modify the command before sending the command to the chip controller 126.

The chip controller 126 may receive a command from the storage device controller 118 and determine a target memory partition 122 for the command. The chip controller 126 may then send the command to a controller of the determined memory partition 122. In various embodiments, the chip controller 126 may modify the command before sending the command to the controller of the partition 122.

In some embodiments, all or some of the elements of system 100 are resident on (or coupled to) the same circuit board (e.g., a motherboard). In various embodiments, any suitable partitioning between the elements may exist. For example, the elements depicted in CPU 102 may be located on a single die (e.g., on-chip) or package or any of the elements of CPU 102 may be located off-chip or off-package. Similarly, the elements depicted in storage device 106 may be located on a single chip or on multiple chips. In various embodiments, a storage device 106 and a computing host (e.g., CPU 102) may be located on the same circuit board or on the same device and in other embodiments the storage device 106 and the computing host may be located on different circuit boards or devices.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 100, such as cores 114, one or more CPU memory controllers 112, I/O controller 110, integrated I/O devices, direct memory access (DMA) logic (not shown), etc. In various embodiments, components of computer system 100 may be coupled together through one or more networks comprising any number of intervening network nodes, such as routers, switches, or other computing devices. For example, a computing host (e.g., CPU 102) and the storage device 106 may be communicably coupled through a network.

Although not depicted, system 100 may use a battery and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102. Other sources of power can be used such as renewable energy (e.g., solar power or motion based power).

Figure 2:
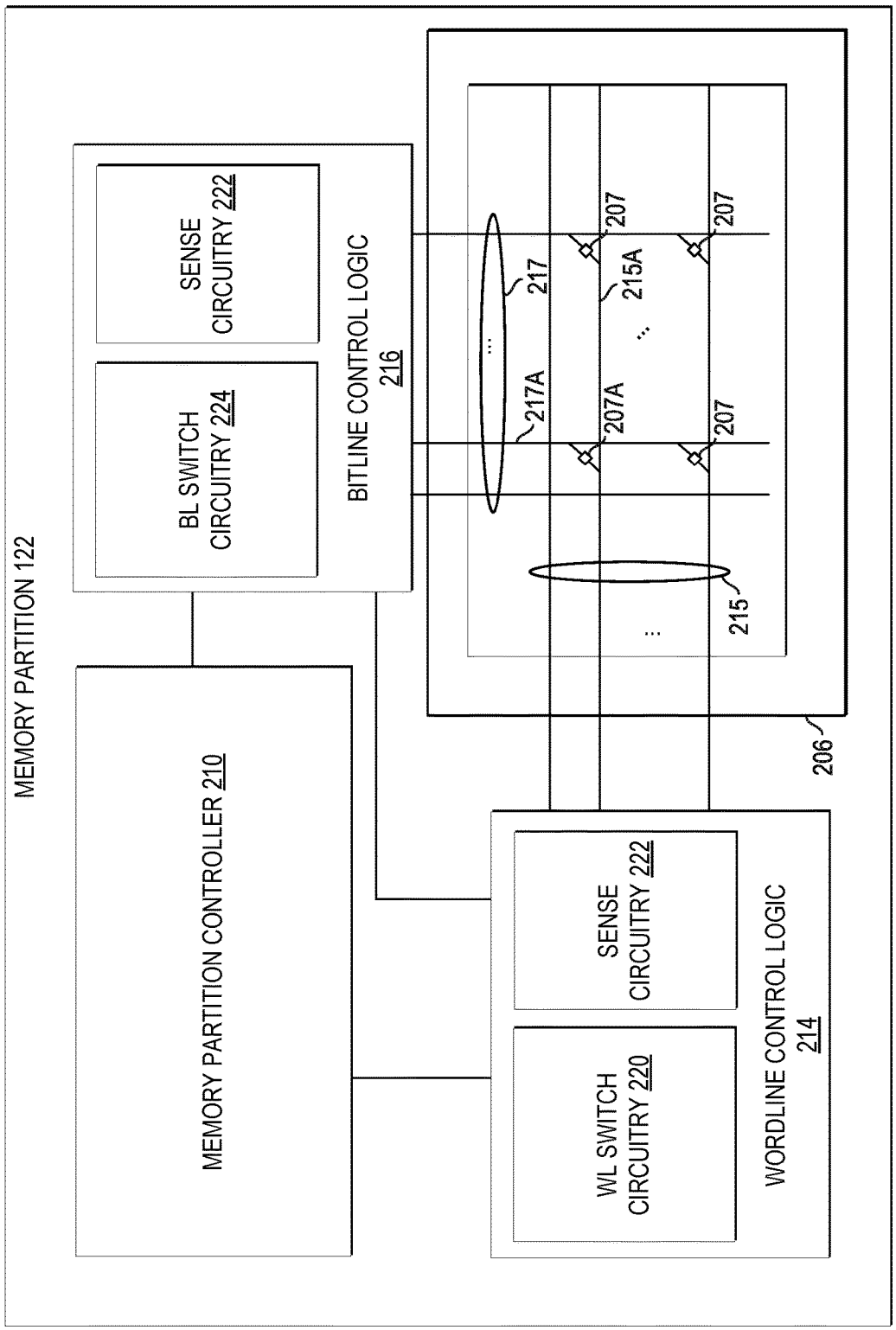
FIG. 2 illustrates a memory partition in accordance with certain embodiments.

FIG. 2 illustrates a detailed exemplary view of the memory partition 122 of FIG. 1 in accordance with certain embodiments. In one embodiment, a memory partition 122 may include 3D crosspoint memory which may include phase change memory or other suitable memory types. In some embodiments, a 3D crosspoint memory array 206 may comprise a transistor-less (e.g., at least with respect to the data storage elements of the memory) stackable crosspoint architecture in which memory cells 207 sit at the intersection of row address lines and column address lines arranged in a grid. The row address lines 215 and column address lines 217, called bitlines (WLs) and wordlines (BLs), respectively, cross in the formation of the grid and each memory cell 207 is coupled between a WL and a BL where the WL and BL cross (e.g., at a crosspoint). At the point of a crossing, the WL and BL may be located at different vertical planes such that the WL crosses over the BL but does not physically touch the BL. As described above, the architecture may be stackable, such that a bitline may cross over a wordline located beneath the bitline and another wordline for another memory cell located above the bitline. It should be noted that row and column are terms of convenience used to provide a qualitative description of the arrangement of WLs and BLs in crosspoint memory. In various embodiments, the cells of the 3D crosspoint memory array may be individually addressable. In some embodiments, bit storage may be based on a change in bulk resistance of a 3D crosspoint memory cell.

FIG. 2 illustrates a memory partition in accordance with certain embodiments. In the embodiment of FIG. 2, a memory partition 122 includes memory partition controller 210, bitline control logic 214, wordline control logic 216, and memory array 206. A host device (e.g., CPU 102) may provide read and/or write commands including memory address(es) and/or associated data to memory partition 122 (e.g., via storage device controller 118 and chip controller 126) and may receive read data from memory partition 122 (e.g., via the chip controller 126 and storage device controller 118). Similarly, storage device controller 118 may provide host-initiated read and write commands or device-initiated read and write commands including memory addresses to memory partition 122 (e.g., via chip controller 126). Memory partition controller 210 (in conjunction with bitline control logic 214 and wordline control logic 216) is configured to perform memory access operations, e.g., reading one or more target memory cells and/or writing to one or more target memory cells.

Memory array 206 corresponds to at least a portion of a 3D crosspoint memory (e.g., that may include phase change memory cells or other suitable memory cells) and includes a plurality of bitlines 215, a plurality of wordlines 217 and a plurality of memory cells, e.g., memory cells 207. Each memory cell is coupled between a bitline ("WL") and a wordline ("BL") at a crosspoint of the WL and the BL. It should be appreciated that which line is the "bitline" and which line is the "wordline is arbitrary, and the label "bitline" and "wordline" may be applied to, e.g., the line connected to either the higher or lower voltage.

Memory partition controller 210 may manage communications with chip controller 126 and/or storage device controller 118. In a particular embodiment, memory partition controller 210 may analyze one or more signals received from another controller to determine whether a command sent via a bus is to be consumed by the memory partition 122. For example, controller 210 may analyze an address of the command and/or a value on an enable signal line to determine whether the command applies to the memory partition 122. Controller 210 may be configured to identify one or more target WLs and/or BLs associated with a received memory address (this memory address may be a separate address from the memory partition address that identifies the memory partition 122, although in some embodiments a portion of an address field of a command may identify the memory partition while another portion of the address field may identify one or more WLs and/or BLs). Memory partition controller 210 may be configured to manage operations of WL control logic 214 and BL control logic 216 based, at least in part, on WL and/or BL identifiers included in a received command. Memory partition controller 210 may include memory partition controller circuitry 211, and a memory controller interface 213. Memory controller interface 213, although shown as a single block in FIG. 2, may include a plurality of interfaces, for example a separate interface for each of the WL control logic 214 and the BL control logic 216.

WL control logic 214 includes WL switch circuitry 220 and sense circuitry 222. WL control logic 214 is configured to receive target WL address(es) from memory partition controller 210 and to select one or more WLs for reading and/or writing operations. For example, WL control logic 214 may be configured to select a target WL by coupling a WL select bias voltage to the target WL. WL control logic 214 may be configured to deselect a WL by decoupling the target WL from the WL select bias voltage and/or by coupling a WL deselect bias voltage (e.g., a neutral bias voltage) to the WL. WL control logic 214 may be coupled to a plurality of WLs 215 included in memory array 206. Each WL may be coupled to a number of memory cells corresponding to a number of BLs 217. WL switch circuitry 220 may include a plurality of switches, each switch configured to couple (or decouple) a respective WL, e.g., WL 215A, to a WL select bias voltage to select the respective WL 215A.

BL control logic 216 includes BL switch circuitry 224. In some embodiments, BL control logic 216 may also include sense circuitry, e.g., sense circuitry 222. BL control logic 216 is configured to select one or more BLs for reading and/or writing operations. BL control logic 216 may be configured to select a target BL by coupling a BL select bias voltage to the target BL. BL control logic 216 may be configured to deselect a BL by decoupling the target BL from the BL select bias voltage and/or by coupling a BL deselect bias voltage (e.g., a neutral bias voltage) to the BL. BL switch circuitry 224 is similar to WL switch circuitry 220 except BL switch circuitry 224 is configured to couple the BL select bias voltage to a target BL.

Sense circuitry 222 is configured to detect the state of one or more sensed memory cells 207 (e.g., via the presence or absence of a snap back event during a sense interval), e.g., during a read operation. Sense circuitry 222 is configured to provide a logic level output related to the result of the read operation to, e.g., memory partition controller 210.

As an example, in response to a signal from memory partition controller 210, WL control logic 214 and BL control logic 216 may be configured to select a target memory cell, e.g., memory cell 207A, for a read operation by coupling WL 215A to WL select bias voltage and BL 217A to BL select bias voltage as well as coupling the other WLs and BLs to respective deselect bias voltages. One or both of sense circuitries 222 may then be configured to monitor WL 215A and/or BL 217A for a sensing interval in order to determine the state of the memory cell 207A.

Thus, WL control logic 214 and/or BL control logic 216 may be configured to select a target memory cell for a read operation, initiate the read operation, sense the selected memory cell (e.g., for a snap back event) in a sensing interval, and provide the result of the sensing to, e.g., memory partition controller 210.

In a particular embodiment, the sense circuitry 222 may include a WL load connected to a WL electrode or gate, and a BL load connected to a BL electrode or gate. When a particular bitline and wordline are selected in the array, a difference between WL load or WL voltage and the BL voltage corresponds to a read VDM. VDM may induce a current ($i_{cell}$) in the memory cell 207A dependent on a program state of the memory cell. A comparator such as a sense amplifier may compare $i_{cell}$ with a reference current in order to read a logic state of the memory cell. In this manner, an output of the sense amplifier/comparator may be indicative of a state of the target memory cell. A latch may be coupled to the output of the comparator to store the output of the read operation.

For each matrix of arrays, there may be a number of sense amplifiers provided, with the sense circuitry 222 able to process up to a maximum number of sensed bits, such as 128 bits, from the sense amplifiers at one time. Hence, in one embodiment, 128 memory cells may be sensed at one time by sense amplifiers of the sense circuitry 222.

Figure 3:
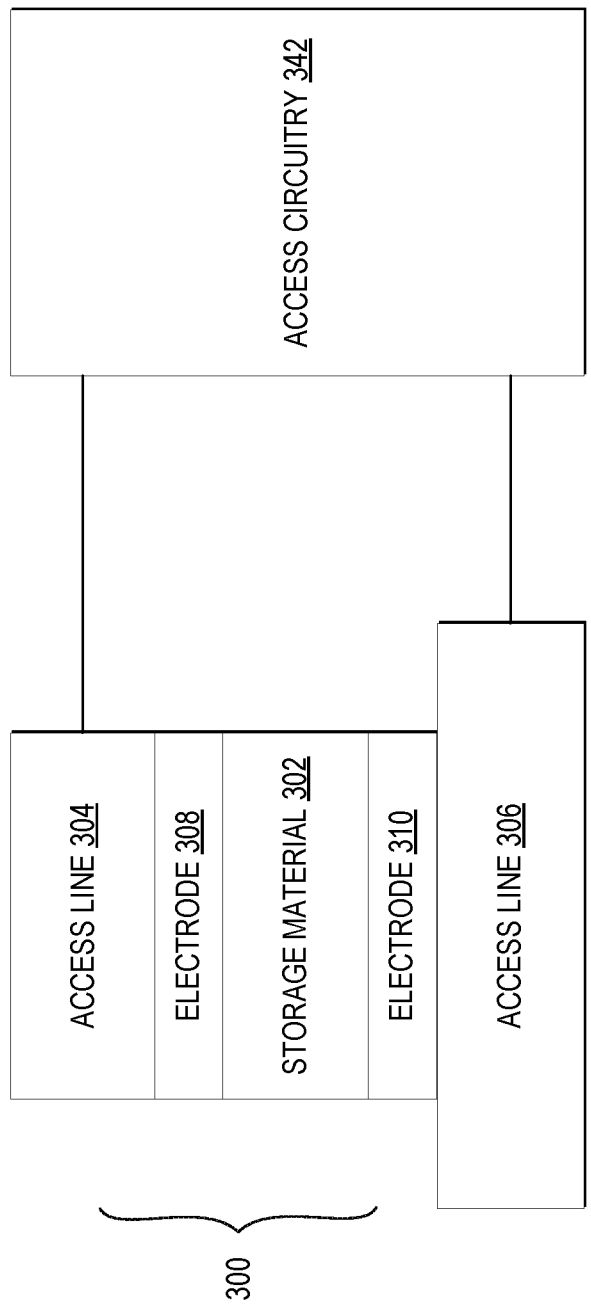
FIG. 3 illustrates a memory cell coupled to access circuitry in accordance with certain embodiments.

FIG. 3 illustrates a memory cell 300 coupled to access circuitry 342 in accordance with certain embodiments. The memory cell 300 includes a storage material 302 between access lines 304 and 306. The access lines 304, 306 electrically couple the memory cell 300 with access circuitry 342 that writes to and reads the memory cell 300. For example, access circuitry 342 may include WL switch circuitry 220, BL switch circuitry 224, sense circuitry 222, or other suitable circuitry.

In one embodiment, storage material 302 includes a self-selecting material that exhibits memory effects. A self-selecting material is a material that enables selection of a memory cell in an array without requiring a separate selector element. Thus, storage material 302 may represent a "selector/storage material." A material exhibits memory effects if circuitry (e.g., 342) for accessing memory cells can cause the material to be in one of multiple states (e.g., via a write operation) and later determine the programmed state (e.g., via a read operation). Access circuitry 342 can store information in the memory cell 300 by causing the storage material 302 to be in a particular state. The storage material 302 can include, for example, a chalcogenide material or other material capable of functioning as both a storage element and a selector, to enable addressing a specific memory cell and determining what the state of the memory cell is. Thus, in one embodiment, the memory cell 300 is a self-selecting memory cell that includes a single layer of material that acts as both a selector element to select the memory cell and a memory element to store a logic state. In the embodiment depicted, each memory cell 300 is a two-terminal device (i.e., the memory cell 300 has two electrodes to receive control signals sufficient to write to and read from the memory cell 300).

In other embodiments, each memory cell (e.g., 300) includes a memory element configured to store information and a separate memory cell select device (e.g., selector) coupled to the memory element. Select devices may include ovonic threshold switches, diodes, bipolar junction transistors, field-effect transistors, etc. In one embodiment, a first chalcogenide layer may comprise the memory element and a second chalcogenide layer may comprise the select device.

The storage material 302 may include any suitable material programmable to a plurality of states. In some embodiments, the storage material 302 may include a chalcogenide material comprising a chemical compound with at least one chalcogen ion, that is, an element from group 16 of the periodic table. For example, the storage material 302 may include one or more of: sulfur (S), selenium (Se), or tellurium (Te). Additionally or alternatively, in various embodiments, storage material 302 may comprise germanium (Ge), antimony (Sb), bismuth (Bi), lead (Pb), tin (Sn), indium (In), silver (Ag), arsenic (As), phosphorus (P), molybdenum (Mo), gallium (Ga), aluminum (Al), oxygen (O), nitrogen (N), chromium (Cr), gold (Au), niobium (Nb), palladium (Pd), cobalt (Co), vanadium (V), nickel (Ni), platinum (Pt), titanium (Ti), tungsten (W), tantalum (Ta), or other materials. In various examples, the storage material 302 may include one or more chalcogenide materials such as such as Te—Se, Ge—Te, In—Se, Sb—Te, Ta—Sb—Te, As—Te, As—Se, Al—Te, As—Se—Te, Ge—Sb—Te, Ge—As—Se, Te—Ge—As, V—Sb—Se, Nb—Sb—Se, In—Sb—Te, In—Se—Te, Te—Sn—Se, V—Sb—Te, Se—Te—Sn, Ge—Se—Ga, Mo—Sb—Se, Cr—Sb—Se, Ta—Sb—Se, Bi—Se—Sb, Mo—Sb—Te, Ge—Bi—Te, W—Sb—Se, Ga—Se—Te, Ge—Te—Se, Cr—Sb—Te, Sn—Sb—Te, W—Sb—Te, As—Sb—Te, Ge—Te—Ti, Te—Ge—Sb—S, Te—Ge—Sn—O, Te—Ge—Sn—Au, Pd—Te—Ge—Sn, In—Se—Ti—Co, Ge—Sb—Te—Pd, Ge—Sb—Te—Co, Sb—Te—Bi—Se, Ag—In—Sb—Te, Ge—Se—Te—In, As—Ge—Sb—Te, Se—As—Ge—In, Ge—Sb—Se—Te, Ge—Sn—Sb—Te, Ge—Te—Sn—Ni, Ge—Te—Sn—Pd, and Ge—Te—Sn—Pt, Si—Ge—As—Se, In—Sn—Sb—Te, Ge—Se—Te—Si, Si—Te—As—Ge, Ag—In—Sb—Te, Ge—Se—Te—In—Si, or Se—As—Ge—Si—In. In other various examples, storage material 302 may include other materials capable of being programmed to one of multiple states, such as Ge—Sb, Ga—Sb, In—Sb, Sn—Sb—Bi, or In—Sb—Ge. One or more elements in a chalcogenide material (or other material used as storage material 302) may be dopants. For example, the storage material 302 may include dopants such as: aluminum (Al), oxygen (O), nitrogen (N), silicon (Si), carbon (C), boron (B), zirconium (Zr), hafnium (Hf), or a combination thereof. In some embodiments, the chalcogenide material (or other material used as storage material 302) may include additional elements such as hydrogen (H), oxygen (O), nitrogen (N), chlorine (Cl), or fluorine (F), each in atomic or molecular forms. The storage material 302 may include other materials or dopants not explicitly listed. In some examples, the storage material (such as any of the materials described above) is a phase change material. In other examples, the storage material 302 is not a phase change material, e.g., can be in one or multiple stable states (or transition between stable states) without a change in phase.

In some embodiments, a selector element coupled to storage material (e.g., in non-self-selecting memory cells) may also include a chalcogenide material. A selector device having a chalcogenide material can sometimes be referred to as an Ovonic Threshold Switch (OTS). An OTS may include a chalcogenide composition including any one of the chalcogenide alloy systems described above for the storage element and may further include an element that can suppress crystallization, such as arsenic (As), nitrogen (N), or carbon (C), to name a few. Examples of OTS materials include Te—As—Ge—Si, Ge—Te—Pb, Ge—Se—Te, Al—As—Te, Se—As—Ge—Si, Se—As—Ge—C, Se—Te—Ge—Si, Ge—Sb—Te—Se, Ge—Bi—Te—Se, Ge—As—Sb—Se, Ge—As—Bi—Te, and Ge—As—Bi—Se, among others.

In some embodiments, an element from column III of the periodic table ("Group III element") may be introduced into a chalcogenide material composition to limit the presence of another material (e.g., Ge) in the selector device. For example, a Group III element may replace some or all of the other material (e.g., Ge) in the composition of the selector device. In some embodiments, a Group III element may form a stable, Group III element-centered tetrahedral bond structure with other elements (e.g., Se, As, and/or Si). Incorporating a Group III element into the chalcogenide material composition may stabilize the selector device to allow for technology scaling and increased cross point technology development (e.g., three-dimensional cross point architectures, RAM deployments, storage deployments, or the like).

In one embodiment, each selector device comprises a chalcogenide material having a composition of Se, As, and at least one of B, Al, Ga, In, and Tl. In some cases, the composition of the chalcogenide material comprises Ge or Si, or both.

In one example, the storage material is capable of switching between two or more stable states without changing phase (in other examples the storage material may switch between two stable states by changing phase). In one such embodiment, the access circuitry 342 programs the memory cell 300 by applying one or more program pulses (e.g., voltage or current pulses) with a particular polarity to cause the storage material 302 to be in the desired stable state. In one embodiment, the access circuitry 342 applies program pulses to the access lines 304, 306 (which may correspond to a wordline and a bitline) to write to or read the memory cell 300. In one embodiment, to write to the memory cell 300, the access circuitry applies one or more program pulses with particular magnitudes, polarities, and pulse widths to the access lines 304, 306 to program the memory cell 300 to the desired stable state, which can both select memory cell 300 and program memory cell 300. In various embodiments below, programming states are depicted as being associated with a single programming pulse, however, the single programming pulse may also be equivalent to a series of programming pulses that have the effective characteristics of the single programming pulse (e.g., a width of the single programming pulse may be equivalent to the sum of the widths of a series of shorter programming pulses).

In one embodiment, programming the memory cell 300 causes the memory cell 300 to "threshold" or undergo a "threshold event." When a memory cell thresholds (e.g., during application of a program pulse), the memory cell undergoes a physical change that causes the memory cell to exhibit a certain threshold voltage in response to the application of a subsequent voltage (e.g., through application of a read pulse with a particular voltage magnitude and polarity). Programming the memory cell 300 can therefore involve applying a program pulse of a given polarity to induce a programming threshold event and application of current for a duration of time, which causes the memory cell 300 to exhibit a particular threshold voltage at a subsequent reading voltage of a same or different polarity. In one such embodiment, the storage material 302 is a self-selecting material that can be programmed by inducing a threshold event.

During a read operation, access circuitry 342 may determine a threshold voltage of a memory cell based on electrical responses to a read voltage applied to the memory cell. Detecting electrical responses can include, for example, detecting a voltage drop (e.g., a threshold voltage) across terminals of a given memory cell of the array or current through the given memory cell. In some cases, detecting a threshold voltage for a memory cell can include determining that the cell's threshold voltage is lower than or higher than a reference voltage, for example a read voltage. The access circuitry 342 can determine the logic state of the memory cell 300 based on the electrical response of the memory cell to the read voltage pulse.

As mentioned above, the access lines 304, 306 electrically couple the memory cell 300 with circuitry 342. The access lines 304, 306 can be referred to as a wordline and bitline, respectively. The bitline is for accessing a particular word in a memory array and the wordline is for accessing a particular bit in the word. The access lines 304, 306 can be composed of one or more metals including: Al, Cu, Ni, Cr, Co, Ru, Rh, Pd, Ag, Pt, Au, Ir, Ta, and W; conductive metal nitrides including TiN, TaN, WN, and TaCN; conductive metal silicides including tantalum silicides, tungsten silicides, nickel silicides, cobalt silicides and titanium silicides; conductive metal silicide nitrides including TiSiN and WSiN; conductive metal carbide nitrides including TiCN and WCN, or any other suitable electrically conductive material.

In one embodiment, electrodes 308, 310 are disposed between storage material 302 and access lines 304, 306. Electrodes 308, 310 electrically couple access lines 304, 306 to storage material 302. Electrodes 308, 310 can be composed of one or more conductive and/or semiconductive materials such as, for example: carbon (C), carbon nitride ($C_xN_y$); n-doped polysilicon and p-doped polysilicon; metals including, Al, Cu, Ni, Mo, Cr, Co, Ru, Rh, Pd, Ag, Pt, Au, Ir, Ta, and W; conductive metal nitrides including TiN, TaN, WN, and TaCN; conductive metal silicides including tantalum silicides, tungsten silicides, nickel silicides, cobalt silicides and titanium silicides; conductive metal silicides nitrides including TiSiN and WSiN; conductive metal carbide nitrides including TiCN and WCN; conductive metal oxides including $RuO_2$, or other suitable conductive materials. In one embodiment, conductive bitline layer can include any suitable metal including, for example, metals including, Al, Cu, Ni, Mo, Cr, Co, Ru, Rh, Pd, Ag, Pt, Au, Ir, Ta, and W; conductive metal nitrides including TiN, TaN, WN, and TaCN; conductive metal silicides including tantalum silicides, tungsten silicides, nickel silicides, cobalt silicides and titanium silicides; conductive metal silicides nitrides including TiSiN and WSiN; conductive metal carbide nitrides including TiCN and WCN, or another suitable electrically conductive material.

The memory cell 300 is one example of a memory cell that may be used as a multi-level cell (storing more than a single logical bit). Other embodiments can include memory cells having additional or different layers of material than illustrated in FIG. 3 (e.g., a selection device between the access line 304 and the storage element, a thin dielectric material between the storage material and access lines, or other suitable configuration).

Figure 4:
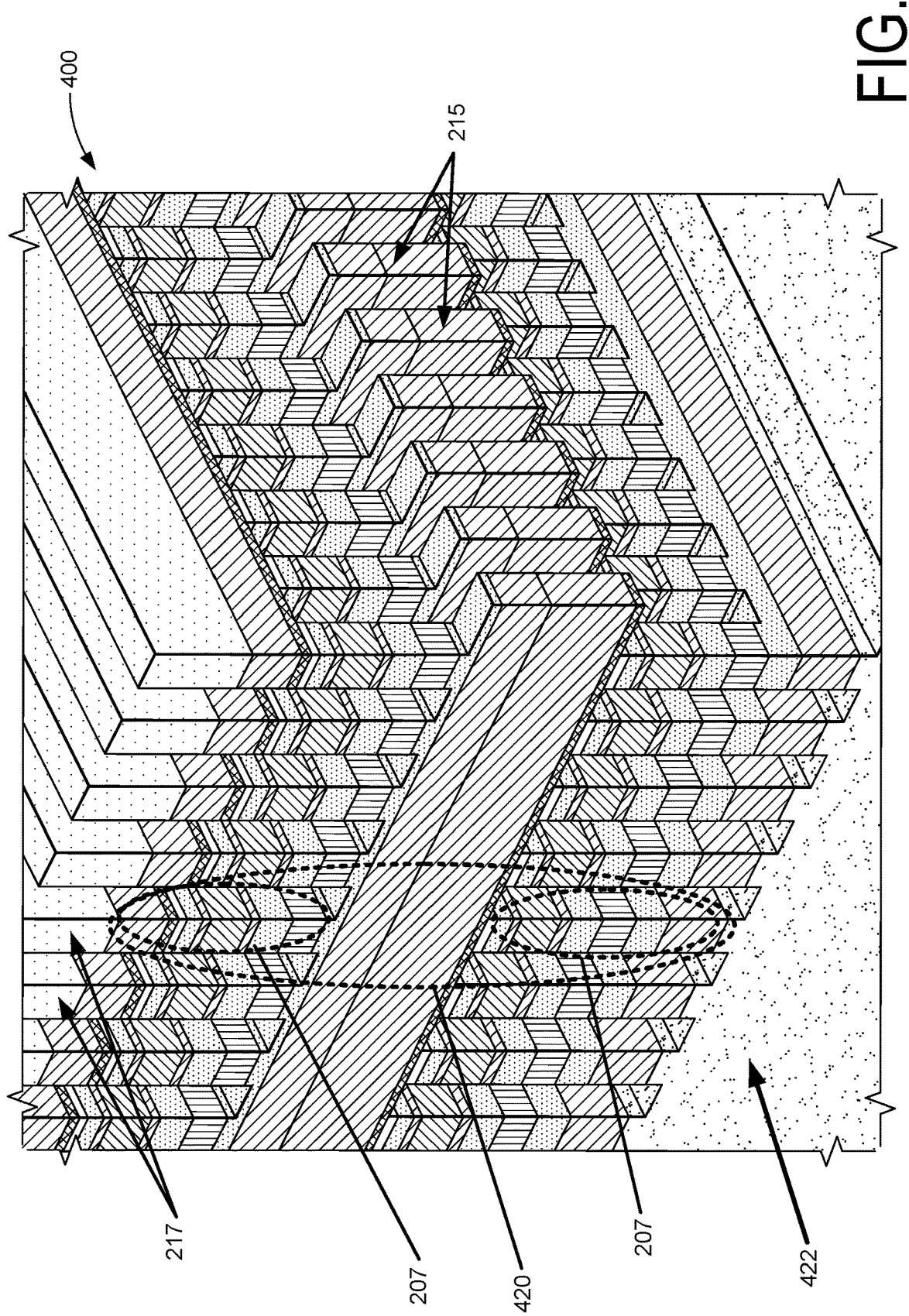
FIG. 4 is a perspective view of portions of a three-dimensional (3D) crosspoint memory stack according to one embodiment.

FIG. 4 is a perspective view of portions of a 3D crosspoint memory stack according to one embodiment. The specific layers are merely examples and will not be described in detail here. Stack 400 is built on substrate structure 422, such as silicon or other semiconductor. Stack 400 includes multiple pillars 420 as memory cell stacks of memory cells 207 or 300. In the diagram of stack 400, it will be observed that the WLs and BLs are orthogonal to each other, and traverse or cross each other in a cross-hatch pattern. A crosspoint memory structure includes at least one memory cell in a stack between layers of BL and WL. As illustrated, bitlines (WL) 215 are in between layers of elements, and wordlines (BL) 217 are located at the top of the circuit. Such a configuration is only an example, and the BL and WL structure can be swapped. Thus, in one representation of stack 400, the WLs can be the metal structures labeled as 217, and the BLs can be the metal structures labeled as 215. Different architectures can use different numbers of stacks of devices, and different configuration of WLs and BLs. It will be understood that the space between pillars 420 is typically an insulator.

Substrate structure 422, such as a silicon substrate, may include control circuitry therein (not shown), such as control circuitry including transistors, row decoders, page buffers, etc. The control circuitry of substrate structure 422 may include, for example, a memory partition controller such as memory partition controller 210, BL control logic such as BL control logic 216, and WL control logic such as WL control logic 214 of FIG. 2, access circuitry 342, or other suitable control circuitry. Each row of WLs 215 extending in the Y direction, the corresponding cells as coupled to corresponding BLs, would define a memory array, and may correspond to a memory array such as memory array 206 of FIG. 2.

Figure 5:
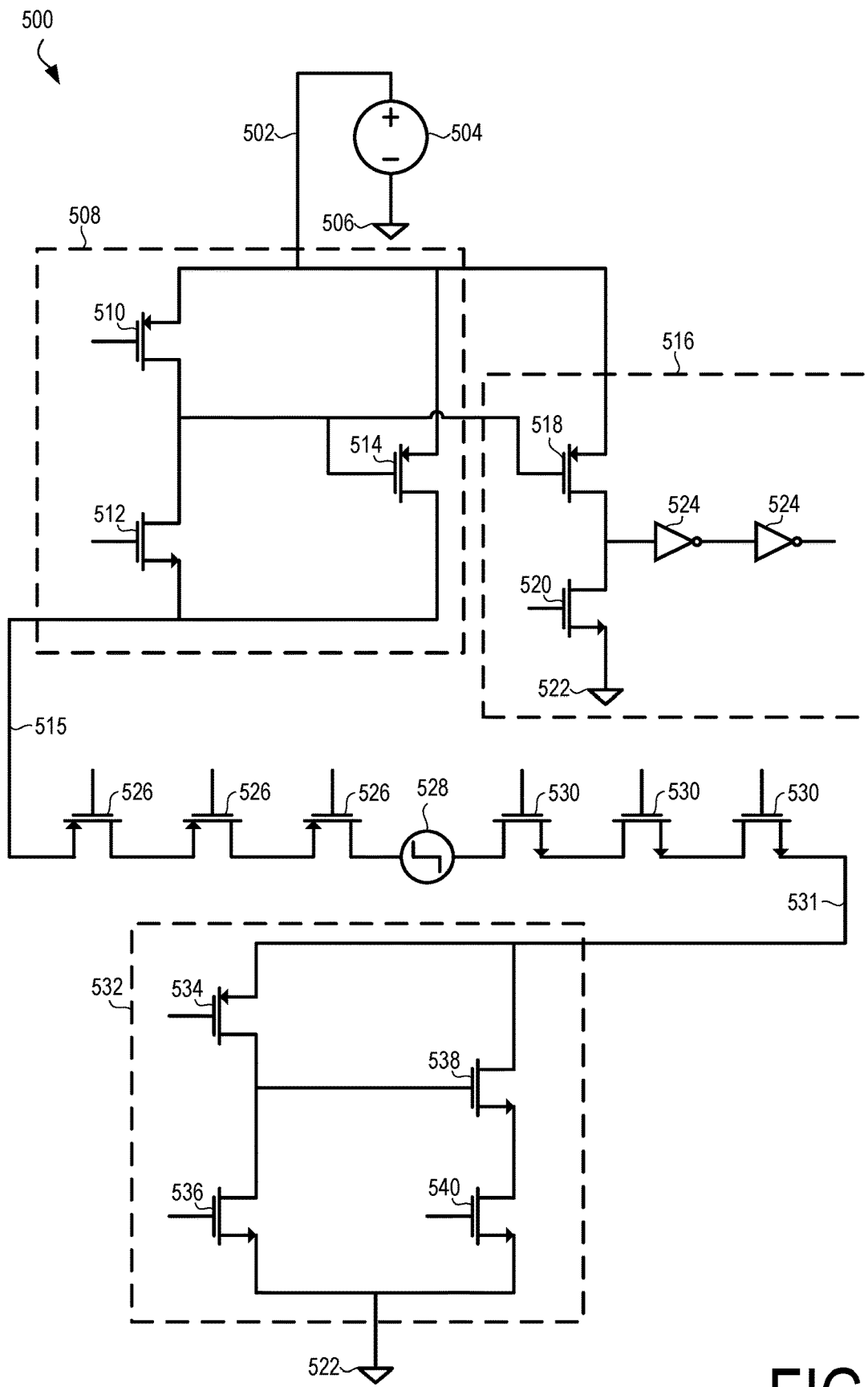
FIG. 5 illustrates a simplified circuit diagram of one embodiment of a circuit for driving a memory cell.

Referring now to FIG. 5, in one embodiment, a simplified circuit 500 for performing operations on a memory cell 528 is illustrated. The circuit 500 includes a bitline voltage regulator 508, sensor circuitry 516, and a wordline voltage regulator 532. The bitline voltage regulator 508 includes a PMOS transistor 510, an NMOS transistor 512, and a PMOS transistor 514. The source of the PMOS transistor 510 is connected to a positive rail 502 connected to a constant voltage regulator 504. The drain of the PMOS transistor 510 is connected to the drain of the NMOS transistor 512 and the gate of the PMOS transistor 514. The source of the NMOS transistor 512 is connected to the bitline 515. The source of the PMOS transistor 514 is connected to the positive rail 502, and the drain of the PMOS transistor 514 is connected to the bitline 515. The gate of the PMOS transistor 510 is connected to a mirror bias voltage, and the gate of the transistor 512 is connected to a demarcation bias voltage.

The bitline 515 is connected through one or more bitline decoder transistors 526, which select a particular memory cell 528 to operate on. A wordline 531 is connected to the memory cell 528 in a similar manner through one or more wordline decoder transistors 530.

In use, the NMOS transistor 512 outputs a voltage at the source approximately equal to the demarcation voltage applied to the gate of the NMOS transistor 512, minus an overdrive voltage that depends on the current sourced by the NMOS transistor 512. When the current sourced from the NMOS transistor 512 is high, such as when the current is first allowed to flow and when the resistance of the memory cell 528 snaps to a low-resistance state, the output voltage at the source of the NMOS transistor 512 is lower. For example, in one embodiment, the NMOS transistor 512 may source, e.g., 0-5 microamps with a relatively low overdrive voltage, but, without something limiting the current, the NMOS transistor 512 may source over 30 microamps, leading to a relatively large overdrive voltage of, e.g., over 200 millivolts.

In order to prevent the NMOS transistor 512 from sourcing too much current, in the illustrative embodiment, a current mirror in the form of a PMOS transistor 510 limits the amount of current through the NMOS transistor 512. The PMOS transistor 510 may limit the current to any suitable value, such as 1-20 microamps. In the illustrative embodiment, the PMOS transistor 510 limits the current to 5 microamps. As the bitline 515 may require additional current to charge up to the demarcation voltage more quickly and to drive current through the memory cell 528 if it snaps to a low-resistance state, a feedback current source in the form of the PMOS transistor 514 is included. In use, when the current through the NMOS transistor 512 is less than five microamps, there will be a relatively low voltage drop across the PMOS transistor 510, pulling the gate of the feedback PMOS transistor 514 high, preventing current flow through the feedback PMOS transistor 514. As the current through the NMOS transistor 512 approaches five microamps, the voltage drop across the PMOS transistor 510 increases, pulling down the gate of the feedback PMOS transistor 514 and allowing current to pass through the PMOS transistor 514. In this manner, the NMOS transistor 512 can control the voltage on the bitline 515 while passing relatively low current, with additional current passed by the feedback PMOS transistor 514 as needed.

Referring now to the sensor circuitry 516, in the illustrative embodiment, the drain of the PMOS transistor 510 is connected to the gate of a current mirror PMOS transistor 518 as well as to the gate of the feedback PMOS transistor 514. As such, the PMOS transistor 518 passes a proportional amount of current through it as the feedback PMOS transistor 514, effectively copying the current through the feedback PMOS transistor 514 to the PMOS transistor 518. In the illustrative embodiment, the current through the PMOS transistor 518 is amplified relative to the current through the PMOS transistor 514 by adjusting the width/length ratio of the PMOS transistor 514 relative to the width/length ratio of the PMOS transistor 518. In the illustrative embodiment, the width/length ratio of the PMOS transistor 518 is about three times that of the PMOS transistor 514, effectively multiplying the current through the PMOS transistor 518 by a factor of three relative to the PMOS transistor 514. In other embodiments, the width/length ratio of the PMOS transistor 518 may be one-half to ten times that of the PMOS transistor 514.

The drain of the PMOS transistor 518 is connected to the drain of an NMOS transistor 520. The source of the NMOS transistor 520 is connected to a negative rail 522. The gate of the NMOS transistor 520 is connected to a bias voltage that limits the current through the NMOS transistor 520. Voltage sensing logic, such as two buffers 524, measure the voltage at the drains of the PMOS transistor 518 and NMOS transistor 520.

In use, the current that can flow through the PMOS transistor 514 (and, therefore, the current that can flow through the PMOS transistor 518) is the excess of the bias current that flows through the PMOS transistor 510. At the time when the measurement by the buffers 524 is performed, the excess is only present when the memory cell 528 has snapped to a low-resistance or set state.

When the PMOS transistor 518 is limiting current to a higher value than the NMOS transistor 520, the drain of the PMOS transistor 518 will be pulled up to the positive rail 502, and the buffers 524 will measure a high voltage. When the PMOS transistor 518 is limiting current to a lower value than the NMOS transistor 520, the drain of the NMOS transistor 520 will be pulled down to negative rail 522, and the buffers 524 will measure a low voltage. As such, sensor circuitry 516 compares the current that can pass through the PMOS transistor 518 to the current that can pass through the NMOS transistor 520.

The NMOS transistor 520 is biased to pass less current than will be passed through the PMOS transistor 518 when the memory cell 528 is in the set state. For example, the PMOS transistor 518 may pass 20 microamps (after multiplying the current through the PMOS transistor 514 by a factor of three), and the NMOS transistor 520 may be biased to pass 10 microamps. More generally, the PMOS transistor 518 may pass, e.g., 5-50 microamps, and the NMOS transistor 520 may be biased to pass, e.g., 2-30 microamps. As a result, the output of the buffers 524 corresponds to the set or reset state of the memory cell 528.

Referring now to the wordline voltage regulator 532, the wordline voltage regulator 532 includes several complementary components as the bitline voltage regulator 508. As the wordline voltage regulator 532 is sinking current to negative rail 522 instead of sourcing current from a positive rail 502, different transistors are used. In particular, a PMOS transistor 534 acts as a source follower, similar to the NMOS transistor 512. The source of the PMOS transistor 534 is connected to the wordline 531. An NMOS transistor 536 acts as a current mirror limiting the current through the PMOS transistor 534, similar to the PMOS transistor 510. A feedback NMOS transistor 538 provides more current flow when the current through the PMOS transistor 534 is limited by the current through the NMOS transistor 536.

In addition, the wordline voltage regulator 532 incudes a component to limit the overall current through the wordline voltage regulator 532 and, therefore, the overall current through the memory cell 528. An NMOS transistor 540 has a source connected to negative rail 522 and a drain connected to the source of the NMOS transistor 538. The NMOS transistor 540 has a bias on its gate limiting the current through it to, e.g., 20-50 microamps.

It should be appreciated that transistors 510, 512, 514, 518, 520, 534, 536, 538, 540 in the circuit 500 are not merely used as digital on/off switches. Rather, each transistor 510, 512, 514, 518, 520, 534, 536, 538, 540 has specific analog response based on the voltage and/or current at the gate, source, and/or drain of each transistor 510, 512, 514, 518, 520, 534, 536, 538, 540.

Figure 6:
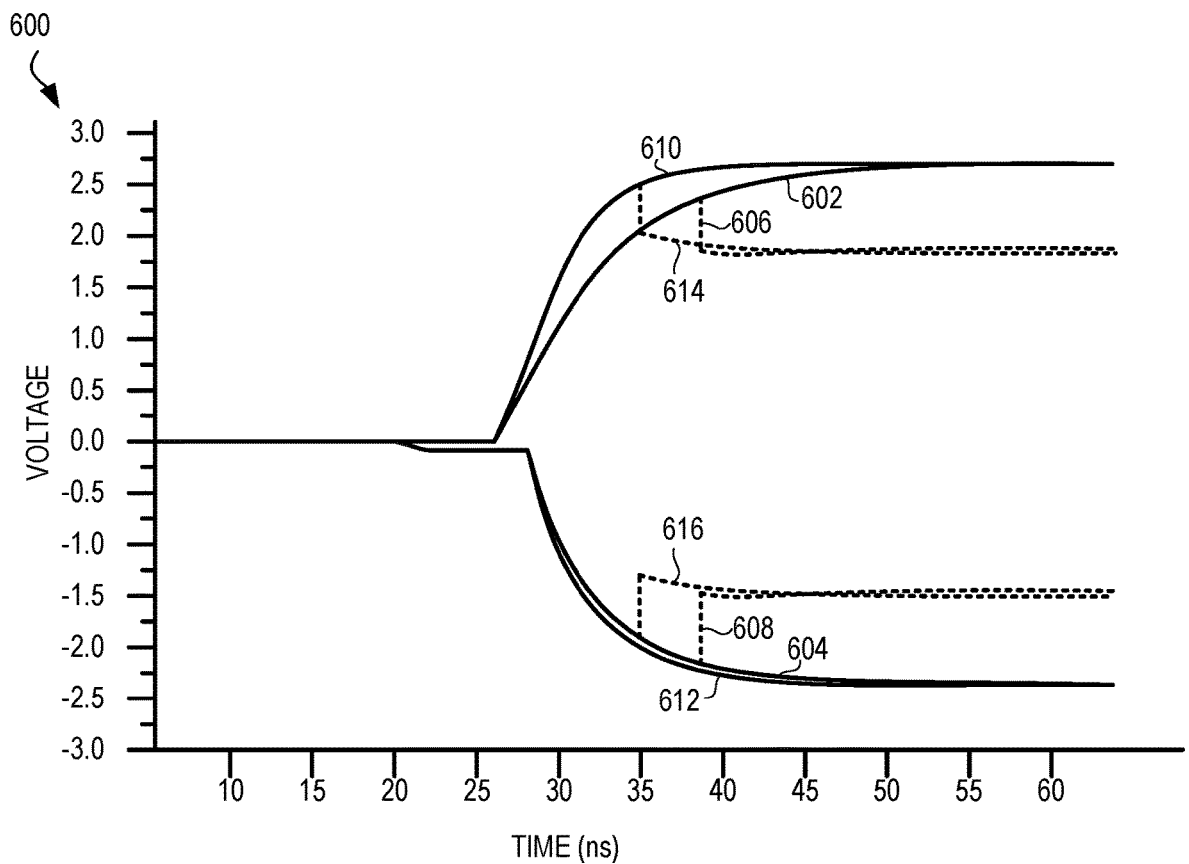
FIG. 6 is a graph showing voltage as a function of time at various points of various embodiments of a circuit for driving a memory cell.

Referring now to FIG. 6, in one embodiment, a plot 600 shows a simulation of the voltage on the bitline 515 and wordline 531 over time. Line 602 corresponds to current driven on the bitline 515 by a source follower NMOS transistor 512 in an embodiment without the current mirror PMOS transistor 510 or the feedback PMOS transistor 514 for a reset cell that did not snap back. Line 604 corresponds to current driven on the wordline 531 by a source follower PMOS transistor 534 in an embodiment without the current mirror NMOS transistor 536 or the feedback NMOS transistor 538 for a reset cell that did not snap back. Line 606 corresponds to current driven on the bitline 515 by a source follower NMOS transistor 512 in an embodiment without the current mirror PMOS transistor 510 or the feedback PMOS transistor 514 for a set cell that did snap back. Line 608 corresponds to current driven on the wordline 531 by a source follower PMOS transistor 534 in an embodiment without the current mirror NMOS transistor 536 or the feedback NMOS transistor 538 for a set cell that did snap back.

Line 610 corresponds to current driven on the bitline 515 by a source follower NMOS transistor 512 in an embodiment with the current mirror PMOS transistor 510 and the feedback PMOS transistor 514 for a reset cell that did not snap back. Line 612 corresponds to current driven on the wordline 531 by a source follower PMOS transistor 534 in an embodiment with the current mirror NMOS transistor 536 and the feedback NMOS transistor 538 for a reset cell that did not snap back. Line 614 corresponds to current driven on the bitline 515 by a source follower NMOS transistor 512 in an embodiment with the current mirror PMOS transistor 510 and the feedback PMOS transistor 514 for a set cell that did snap back. Line 616 corresponds to current driven on the wordline 531 by a source follower PMOS transistor 534 in an embodiment with the current mirror NMOS transistor 536 and the feedback NMOS transistor 538 for a set cell that did snap back.

As shown in the plot 600, the lines 614, 616 snap back about five nanoseconds earlier than the lines 606, 608, lowering the latency in reading the state of the memory cell 528.

Figure 7:
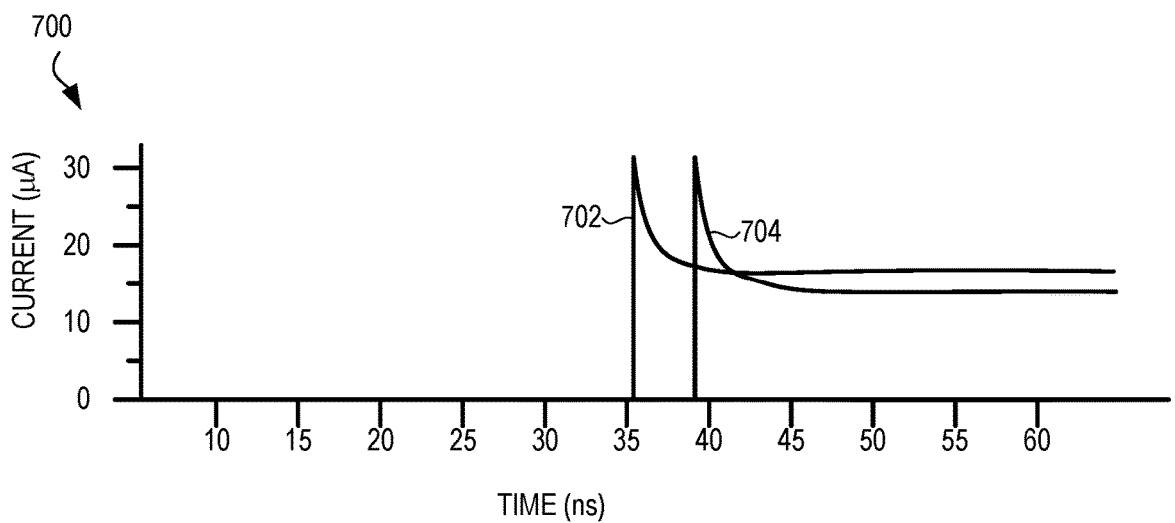
FIG. 7 is a graph showing current through a memory cell as a function of time for various embodiments of a circuit for driving a memory cell.

Referring now to FIG. 7, in one embodiment, a plot 700 shows a simulation of the current through a memory cell 528 as a function of time for a reset cell 528 that snaps back. Line 702 shows the current through a memory cell 528 in an embodiment with the current mirror PMOS transistor 510 and the feedback PMOS transistor 514 as well as the current mirror NMOS transistor 536 and the feedback NMOS transistor 538. Line 704 shows the current through a memory cell 528 in an embodiment without the current mirror PMOS transistor 510 and the feedback PMOS transistor 514 as well as without the current mirror NMOS transistor 536 and the feedback NMOS transistor 538. As shown in FIG. 7 as well as FIG. 6, the memory cell 528 in the embodiment corresponding to line 702 snaps back about five nanoseconds before the memory cell 528 corresponding to line 704. Additionally, the memory cell 528 corresponding to the line 702 has more current flowing through it as compared to the memory cell 528 corresponding to the line 704, increasing the sensing window to determine the state of the memory cell 528.

Figure 8:
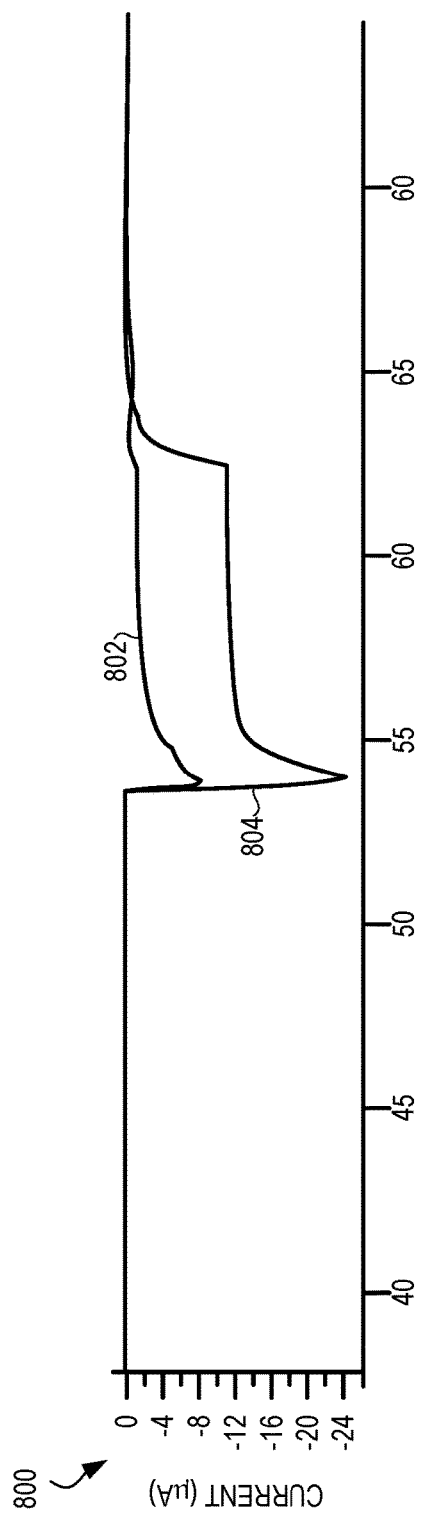
FIG. 8 is a graph showing current through a component as a function of time for various embodiments of a circuit for driving a memory cell.

Referring now to FIG. 8, in one embodiment, a plot 800 shows a simulation of the current through the current mirror PMOS transistor 518 as a function of time. Line 802 shows current through the current mirror PMOS transistor 518 as a function of time for a memory cell 528 that is reset and did not snap back, showing a relatively small amount of current through the current mirror PMOS transistor 518. Line 804 shows current through the current mirror PMOS transistor 518 as a function of time for a memory cell 528 that is set and did snap back, showing a relatively large amount of current through the current mirror PMOS transistor 518.

Figure 9:
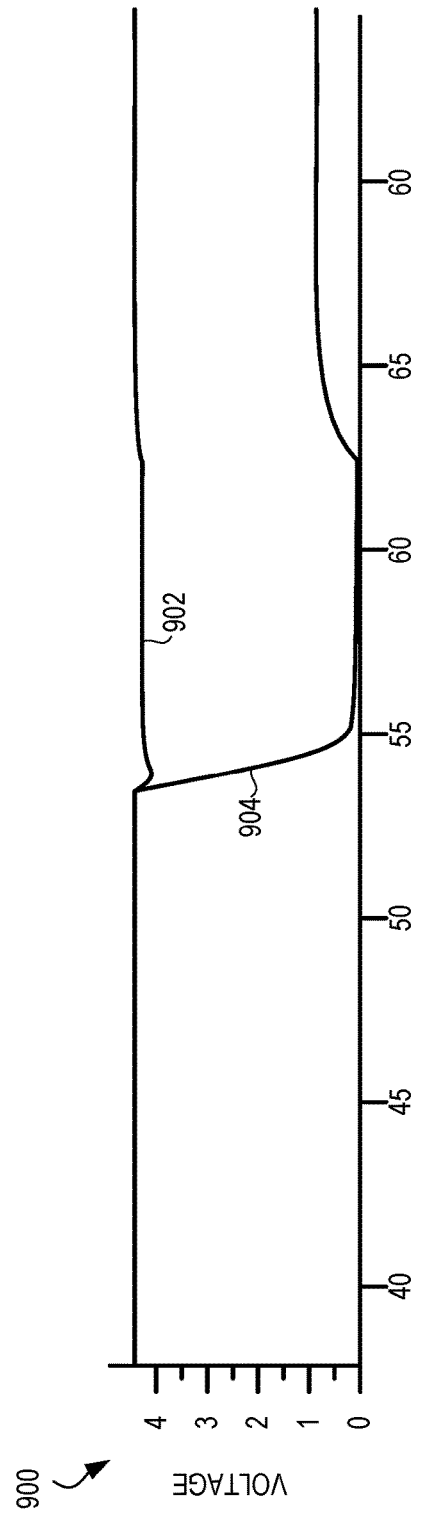
FIG. 9 is a graph showing voltage at a component as a function of time for various embodiments of a circuit for driving a memory cell.

Referring now to FIG. 9, in one embodiment, a plot 900 shows a simulation of the output of the buffers 524 as a function of time. Line 902 shows the output of the buffers 524 as a function of time for a memory cell 528 that is reset and did not snap back, showing that the relatively low current passing through the current mirror PMOS transistor 518 (see line 802 in FIG. 8) does not trigger the buffers 524. Line 904 shows the output of the buffers 524 as a function of time for a memory cell 528 that is set and did snap back, showing that the relatively large amount of current through the current mirror PMOS transistor 518 (see line 804 in FIG. 8) does trigger the buffers 524.

Examples

Illustrative examples of the technologies disclosed herein are provided below. An embodiment of the technologies may include any one or more, and any combination of, the examples described below.

Example 1 includes a memory die comprising a plurality of three-dimensional crosspoint memory cells; and a voltage regulator to drive a bitline of the plurality of three-dimensional crosspoint memory cells, the voltage regulator to drive the bitline comprising a first PMOS transistor, wherein a source of the first PMOS transistor is connected to a positive rail; an NMOS transistor, wherein a drain of the NMOS transistor is connected to a drain of the first PMOS transistor, wherein a source of the NMOS transistor is connected to the bitline; and a second PMOS transistor, wherein a source of the second PMOS transistor is connected to the positive rail, wherein a drain of the second PMOS transistor is connected to the source of the NMOS transistor, wherein a gate of the second PMOS transistor is connected to the drain of the first PMOS transistor and the drain of the NMOS transistor.

Example 2 includes the subject matter of Example 1, and further including a current mirror bias voltage regulator connected to a gate of the first PMOS transistor; and a bitline voltage demarcation bias voltage regulator connected to a gate of the NMOS transistor.

Example 3 includes the subject matter of any of Examples 1 and 2, and further including a third PMOS transistor, wherein a source of the third PMOS transistor is connected to the positive rail, wherein a gate of the third PMOS transistor is connected to the drain of the first PMOS transistor and the drain of the NMOS transistor; and one or more digital logic gates to sense a voltage at a drain of the third PMOS transistor.

Example 4 includes the subject matter of any of Examples 1-3, and further including a second NMOS transistor, wherein a drain of the second NMOS transistor is connected to the drain of the third PMOS transistor, wherein a source of the second NMOS transistor is connected to a negative rail, wherein a gate of the second NMOS transistor is connected to a bias voltage to limit current through the second NMOS transistor.

Example 5 includes the subject matter of any of Examples 1-4, and wherein the bias voltage is to limit current through the second NMOS transistor to between 5 and 15 microamps.

Example 6 includes the subject matter of any of Examples 1-5, and wherein the third PMOS transistor has a width/length ratio at least twice a width/length ratio of the second PMOS transistor.

Example 7 includes the subject matter of any of Examples 1-6, and further including a voltage regulator to drive a wordline of the plurality of three-dimensional crosspoint memory cells, the voltage regulator to drive the wordline comprising a second NMOS transistor, wherein a source of the second NMOS transistor is connected to a negative rail; a third PMOS transistor, wherein a drain of the third PMOS transistor is connected to a drain of the second NMOS transistor, wherein a source of the third PMOS transistor is connected to the wordline; and a third NMOS transistor, wherein a drain of the third NMOS transistor is connected to the source of the third PMOS transistor, wherein a gate of the third NMOS transistor is connected to the drain of the second NMOS transistor and the drain of the third PMOS transistor.

Example 8 includes the subject matter of any of Examples 1-7, and further including a fourth NMOS transistor, wherein a source of the third NMOS transistor is connected to a drain of the fourth NMOS transistor, wherein a source of the fourth NMOS transistor is connected to the negative rail.

Example 9 includes the subject matter of any of Examples 1-8, and further including a current limit bias voltage regulator connected to a gate of the fourth NMOS transistor.

Example 10 includes a system comprising the memory die of any of Examples 1-9, the system comprising one or more processors; and one or more storage devices communicatively coupled to the one or more processors, the one or more storage devices comprising the memory die.

Example 11 includes a memory die comprising a plurality of three-dimensional crosspoint memory cells; and sensor circuitry comprising a current mirror PMOS transistor, wherein a source of the current mirror PMOS transistor is connected to a positive rail, wherein a gate of the current mirror PMOS transistor is connected to the drain of a second PMOS transistor that is to provide current to a memory cell of the plurality of three-dimensional crosspoint memory cells; and one or more digital logic gates to sense a voltage at a drain of the current mirror PMOS transistor based on a state of the memory cell.

Example 12 includes the subject matter of Example 11, and further including an NMOS transistor, wherein a drain of the NMOS transistor is connected to the drain of the current mirror PMOS transistor, wherein a source of the NMOS transistor is connected to a negative rail, wherein a gate of the NMOS transistor is connected to a bias voltage to limit current through the NMOS transistor.

Example 13 includes the subject matter of any of Examples 11 and 12, and further including a voltage regulator to drive a bitline of the plurality of three-dimensional crosspoint memory cells, the voltage regulator to drive the bitline comprising a third PMOS transistor, wherein a source of the third PMOS transistor is connected to the positive rail; an NMOS transistor, wherein a drain of the NMOS transistor is connected to a drain of the third PMOS transistor, wherein a source of the NMOS transistor is connected to the bitline; and the second PMOS transistor, wherein a source of the second PMOS transistor is connected to the positive rail, wherein a drain of the second PMOS transistor is connected to the source of the NMOS transistor, wherein a gate of the second PMOS transistor is connected to the drain of the third PMOS transistor and the drain of the NMOS transistor.

Example 14 includes a memory die comprising a plurality of three-dimensional crosspoint memory cells; and means for providing a demarcation voltage to a bitline of the plurality of memory cells; means for limiting current through the means for providing the demarcation voltage; and means for providing additional current to the bitline in response to sensing that current through the means for providing the demarcation voltage is limited.

Example 15 includes the subject matter of Example 14, and wherein the means for limiting current through the means for providing the demarcation voltage comprises a first PMOS transistor, wherein a source of the first PMOS transistor is connected to a positive rail, wherein the means for providing the demarcation voltage comprises an NMOS transistor, wherein a drain of the NMOS transistor is connected to a drain of the first PMOS transistor, wherein a source of the NMOS transistor is connected to the bitline, wherein the means for providing additional current to the bitline comprises a second PMOS transistor, wherein a source of the second PMOS transistor is connected to the positive rail, wherein a drain of the second PMOS transistor is connected to the source of the NMOS transistor, wherein a gate of the second PMOS transistor is connected to the drain of the first PMOS transistor and the drain of the NMOS transistor.

Example 16 includes the subject matter of any of Examples 14 and 15, and further including a current mirror bias voltage regulator connected to a gate of the first PMOS transistor; and a bitline voltage demarcation bias voltage regulator connected to a gate of the NMOS transistor.

Example 17 includes the subject matter of any of Examples 14-16, and further including a voltage regulator to drive a wordline of the plurality of three-dimensional crosspoint memory cells, the voltage regulator to drive the wordline comprising a second NMOS transistor, wherein a source of the second NMOS transistor is connected to a negative rail; a third PMOS transistor, wherein a drain of the third PMOS transistor is connected to a drain of the second NMOS transistor, wherein a source of the third PMOS transistor is connected to the wordline; and a third NMOS transistor, wherein a drain of the third NMOS transistor is connected to the source of the third PMOS transistor, wherein a gate of the third NMOS transistor is connected to the drain of the second NMOS transistor and the drain of the third PMOS transistor.

Example 18 includes the subject matter of any of Examples 14-17, and further including a fourth NMOS transistor, wherein a source of the third NMOS transistor is connected to a drain of the fourth NMOS transistor, wherein a source of the fourth NMOS transistor is connected to the negative rail.

Example 19 includes the subject matter of any of Examples 14-18, and further including a current limit bias voltage regulator connected to a gate of the fourth NMOS transistor.

Example 20 includes the subject matter of any of Examples 14-19, and further including means for sensing current through the means for providing additional current to the bitline.

Example 21 includes the subject matter of any of Examples 14-20, and wherein the means for sensing current through the means for providing additional current comprises a current mirror PMOS transistor, wherein a source of the current mirror PMOS transistor is connected to a positive rail, wherein a gate of the current mirror PMOS transistor is connected to the drain of a second PMOS transistor that is part of the means for providing additional current; and one or more digital logic gates to sense a voltage at a drain of the third PMOS transistor.

Example 22 includes the subject matter of any of Examples 14-21, and further including an NMOS transistor, wherein a drain of the NMOS transistor is connected to the drain of the current mirror PMOS transistor, wherein a source of the NMOS transistor is connected to a negative rail, wherein a gate of the NMOS transistor is connected to a bias voltage to limit current through the NMOS transistor.

Example 23 includes a system comprising the memory die of any of Examples 14-22, the system comprising one or more processors; and one or more storage devices communicatively coupled to the one or more processors, the one or more storage devices comprising the memory die.

The invention claimed is:
1. A memory die comprising:
a plurality of three-dimensional crosspoint memory cells; and
a voltage regulator to drive a bitline of the plurality of three-dimensional crosspoint memory cells, the voltage regulator to drive the bitline comprising:
a first PMOS transistor, wherein a source of the first PMOS transistor is connected to a positive rail;
an NMOS transistor, wherein a drain of the NMOS transistor is connected to a drain of the first PMOS transistor, wherein a source of the NMOS transistor is connected to the bitline; and
a second PMOS transistor, wherein a source of the second PMOS transistor is connected to the positive rail, wherein a drain of the second PMOS transistor is connected to the source of the NMOS transistor, wherein a gate of the second PMOS transistor is connected to the drain of the first PMOS transistor and the drain of the NMOS transistor.

2. The memory die of claim 1, further comprising:
a current mirror bias voltage regulator connected to a gate of the first PMOS transistor; and
a bitline voltage demarcation bias voltage regulator connected to a gate of the NMOS transistor.

3. The memory die of claim 1, further comprising:
a third PMOS transistor, wherein a source of the third PMOS transistor is connected to the positive rail, wherein a gate of the third PMOS transistor is connected to the drain of the first PMOS transistor and the drain of the NMOS transistor; and
one or more digital logic gates to sense a voltage at a drain of the third PMOS transistor.

4. The memory die of claim 3, further comprising:
a second NMOS transistor, wherein a drain of the second NMOS transistor is connected to the drain of the third PMOS transistor, wherein a source of the second NMOS transistor is connected to a negative rail, wherein a gate of the second NMOS transistor is connected to a bias voltage to limit current through the second NMOS transistor.

5. The memory die of claim 4, wherein the bias voltage is to limit current through the second NMOS transistor to between 5 and 15 microamps.

6. The memory die of claim 3, wherein the third PMOS transistor has a width/length ratio at least twice a width/length ratio of the second PMOS transistor.

7. The memory die of claim 1, further comprising a voltage regulator to drive a wordline of the plurality of three-dimensional crosspoint memory cells, the voltage regulator to drive the wordline comprising:
a second NMOS transistor, wherein a source of the second NMOS transistor is connected to a negative rail;
a third PMOS transistor, wherein a drain of the third PMOS transistor is connected to a drain of the second NMOS transistor, wherein a source of the third PMOS transistor is connected to the wordline; and
a third NMOS transistor, wherein a drain of the third NMOS transistor is connected to the source of the third PMOS transistor, wherein a gate of the third NMOS transistor is connected to the drain of the second NMOS transistor and the drain of the third PMOS transistor.

8. The memory die of claim 7, further comprising a fourth NMOS transistor, wherein a source of the third NMOS transistor is connected to a drain of the fourth NMOS transistor, wherein a source of the fourth NMOS transistor is connected to the negative rail.

9. The memory die of claim 8, further comprising a current limit bias voltage regulator connected to a gate of the fourth NMOS transistor.

10. A system comprising the memory die of claim 1, the system comprising:
one or more processors; and
one or more storage devices communicatively coupled to the one or more processors, the one or more storage devices comprising the memory die.

11. A memory die comprising:
a plurality of three-dimensional crosspoint memory cells;
sensor circuitry comprising:
a current mirror PMOS transistor, wherein a source of the current mirror PMOS transistor is connected to a positive rail, wherein a gate of the current mirror PMOS transistor is connected to a drain of a second PMOS transistor that is to provide current to a memory cell of the plurality of three-dimensional crosspoint memory cells; and
one or more digital logic gates to sense a voltage at a drain of the current mirror PMOS transistor based on a state of the memory cell; and
a voltage regulator to drive a bitline of the plurality of three-dimensional crosspoint memory cells, the voltage regulator to drive the bitline comprising:
a third PMOS transistor, wherein a source of the third PMOS transistor is connected to the positive rail;
an NMOS transistor, wherein a drain of the NMOS transistor is connected to a drain of the third PMOS transistor, wherein a source of the NMOS transistor is connected to the bitline; and
the second PMOS transistor, wherein a source of the second PMOS transistor is connected to the positive rail, wherein a drain of the second PMOS transistor is connected to the source of the NMOS transistor, wherein a gate of the second PMOS transistor is connected to the drain of the third PMOS transistor and the drain of the NMOS transistor.

12. The memory die of claim 11, further comprising:
a second NMOS transistor, wherein a drain of the second NMOS transistor is connected to the drain of the current mirror PMOS transistor, wherein a source of the second NMOS transistor is connected to a negative rail, wherein a gate of the second NMOS transistor is connected to a bias voltage to limit current through the second NMOS transistor.

13. A memory die comprising:
a plurality of three-dimensional crosspoint memory cells; and
means for providing a demarcation voltage to a bitline of the plurality of three-dimensional crosspoint memory cells;
means for limiting current through the means for providing the demarcation voltage;
means for providing additional current to the bitline in response to sensing that current through the means for providing the demarcation voltage is limited; and
means for sensing current through the means for providing additional current to the bitline.

14. The memory die of claim 13,
wherein the means for limiting current through the means for providing the demarcation voltage comprises a first PMOS transistor, wherein a source of the first PMOS transistor is connected to a positive rail,
wherein the means for providing the demarcation voltage comprises an NMOS transistor, wherein a drain of the NMOS transistor is connected to a drain of the first PMOS transistor, wherein a source of the NMOS transistor is connected to the bitline,
wherein the means for providing additional current to the bitline comprises a second PMOS transistor, wherein a source of the second PMOS transistor is connected to the positive rail, wherein a drain of the second PMOS transistor is connected to the source of the NMOS transistor, wherein a gate of the second PMOS transistor is connected to the drain of the first PMOS transistor and the drain of the NMOS transistor.

15. The memory die of claim 14, further comprising:
a current mirror bias voltage regulator connected to a gate of the first PMOS transistor; and
a bitline voltage demarcation bias voltage regulator connected to a gate of the NMOS transistor.

16. The memory die of claim 14, further comprising a voltage regulator to drive a wordline of the plurality of three-dimensional crosspoint memory cells, the voltage regulator to drive the wordline comprising:
a second NMOS transistor, wherein a source of the second NMOS transistor is connected to a negative rail;
a third PMOS transistor, wherein a drain of the third PMOS transistor is connected to a drain of the second NMOS transistor, wherein a source of the third PMOS transistor is connected to the wordline; and
a third NMOS transistor, wherein a drain of the third NMOS transistor is connected to the source of the third PMOS transistor, wherein a gate of the third NMOS transistor is connected to the drain of the second NMOS transistor and the drain of the third PMOS transistor.

17. The memory die of claim 16, further comprising a fourth NMOS transistor, wherein a source of the third NMOS transistor is connected to a drain of the fourth NMOS transistor, wherein a source of the fourth NMOS transistor is connected to the negative rail.

18. The memory die of claim 17, further comprising a current limit bias voltage regulator connected to a gate of the fourth NMOS transistor.

19. The memory die of claim 13, wherein the means for sensing current through the means for providing additional current comprises:
a current mirror PMOS transistor, wherein a source of the current mirror PMOS transistor is connected to a positive rail, wherein a gate of the current mirror PMOS transistor is connected to a drain of a second PMOS transistor that is part of the means for providing additional current; and
one or more digital logic gates to sense a voltage at a drain of the current mirror PMOS transistor.

20. The memory die of claim 19, further comprising:
an NMOS transistor, wherein a drain of the NMOS transistor is connected to the drain of the current mirror PMOS transistor, wherein a source of the NMOS transistor is connected to a negative rail, wherein a gate of the NMOS transistor is connected to a bias voltage to limit current through the NMOS transistor.

21. A system comprising the memory die of claim 14, the system comprising:
one or more processors; and
one or more storage devices communicatively coupled to the one or more processors, the one or more storage devices comprising the memory die.

* * * * *